United States Patent [19]  
Yamada et al.

[11] 4,333,988  
[45] Jun. 8, 1982

[54] MAGNETIC RECORDING MEDIA

[75] Inventors: Yasuyuki Yamada; Kenichi Masuyama; Tatsuji Kitamoto, all of Odawara, Japan

[73] Assignee: Fuji Photo Film Co., Ltd., Kanagawa, Japan

[21] Appl. No.: 74,469

[22] Filed: Sep. 11, 1979

[30] Foreign Application Priority Data

Sep. 11, 1978 [JP] Japan ................................ 53-111581

[51] Int. Cl.$^3$ ................................................ G11B 5/70
[52] U.S. Cl. .............................. 428/425.9; 252/62.54; 360/134; 360/135; 360/136; 428/522; 428/694; 428/900
[58] Field of Search ................... 428/900, 539, 425.9, 428/694, 695, 520, 522, 424.7; 252/62.54; 427/128, 127; 360/134, 135, 136

[56] References Cited

U.S. PATENT DOCUMENTS

| | | | |
|---|---|---|---|
| 3,630,771 | 12/1971 | Akashi et al. | 252/62.54 |
| 3,634,137 | 1/1972 | Akashi et al. | 427/128 |
| 3,650,828 | 3/1972 | Higashi | 428/425.9 |
| 3,681,137 | 8/1972 | Nagazuno et al. | 252/62.54 |
| 3,926,826 | 12/1975 | Graham et al. | 252/62.54 |
| 4,020,227 | 4/1976 | Defeyes | 428/900 |
| 4,049,871 | 9/1977 | Ogawa et al. | 428/900 |
| 4,152,484 | 5/1979 | Bachmann et al. | 428/900 |
| 4,172,176 | 10/1979 | Tanaka et al. | 428/900 |
| 4,196,258 | 4/1980 | Huisman et al. | 428/694 |

FOREIGN PATENT DOCUMENTS

| | | | |
|---|---|---|---|
| 2236080 | 2/1974 | Fed. Rep. of Germany | 427/128 |
| 47-28046 | 7/1972 | Japan | 427/128 |
| 47-28048 | 7/1972 | Japan | 427/128 |
| 47-31443 | 8/1972 | Japan | 428/900 |
| 47-31444 | 8/1972 | Japan | 427/128 |
| 48-40081 | 11/1973 | Japan | 427/128 |
| 51-31484 | 9/1976 | Japan | 427/128 |
| 54-5281 | 3/1979 | Japan | 427/128 |
| 54-151409 | 11/1979 | Japan | 428/900 |
| 54-151416 | 11/1979 | Japan | 428/425.9 |
| 627528 | 8/1978 | U.S.S.R. | 428/900 |

Primary Examiner—Stanley S. Silverman  
Attorney, Agent, or Firm—Sughrue, Mion, Zinn, Macpeak and Seas

[57] ABSTRACT

A recording medium and, more particularly, a recording medium based on a composition exhibiting high dispersibility for finely-divided ferromagnetic powders having excellent abrasion resistance is disclosed in which the magnetic composition comprises a finely-divided ferromagnetic powders dispersed in a binder containing 2-chloroacrylonitrile polymer and a polyurethane prepolymer; in another embodiment of the invention the magnetic composition additionally contains a polyisocyanate compound.

24 Claims, No Drawings

MAGNETIC RECORDING MEDIA

BACKGROUND OF THE INVENTION

1. Field of the Invention

The present invention relates to binders of magnetic recording media and, particularly, to compositions which show high dispersibility of finely-divided ferromagnetic powders and have excellent abrasion resistance.

2. Description of the Prior Art

Hitherto, cellulose derivatives, vinyl chloride-vinyl acetate copolymers, polyurethane resins, acrylic copolymers, vinylidene chloride polymers and copolymers, synthetic rubbers and polyesters, etc. have been used alone or as a mixture of them. Although nitrocellulose (nitro cotton) is able to disperse finely-divided ferromagnetic pigments quite well and imparts suitable tape characteristics when it is used as the binder for magnetic tapes, it has problems on handling thereof. Namely, it has defects that it has a property of spontaneous combustion and it is very easy to burn. Further, copolymers composed mainly of vinyl chloride, for example, vinyl chloride-vinyl acetate copolymers, are not satisfactory in the viewpoint of dispersibility of magnetic pigments. Further, combinations of other binders do not have sufficient properties in the viewpoint of high dispersibility to magnetic materials and abrasion resistance.

SUMMARY OF THE INVENTION

The present invention provides magnetic recording media which have the following characteristics.

(a) Magnetic recording media having an excellent surface property.
(b) Magnetic recording media having a magnetic layer which have good dispersibility to magnetic materials and an excellent B-H character.
(c) Magnetic recording media in which the magnetic layer has durability and, particularly, occurrence of dropping-out by abrasion is very small.
(d) Magnetic recording media in which deterioration of the magnetic layer by the lapse of time is very small.
(e) Magnetic recording media having small temperature and humidity dependency.
(f) Magnetic recording media in which adhesion of the layer to the base is excellent.
(g) Magnetic recording media by which abrasion loss of the magnetic head is small.
(h) Magnetic recording media having a low coefficient of friction.
(i) Magnetic recording media having excellent S/N.

As a result of various studies of 2-chloroarcylonitrile polymers which have been known to use for magnetic tapes, the present inventors have found that they show excellent dispersibility of magnetic pigments but have poor durability and that, if they are used together with polyurethane prepolymers, tapes which satisfy the above described characteristics can be obtained. Namely, the present invention relates to magnetic recording media which are prepared by dispersing a finely-divided ferromagnetic power in a binder and applying the composition to a base, which are characterized in that 2-chloroacrylonitrile polymers and polyurethane prepolymers are contained as binder components. Further, it is possible to produce magnetic recording mediums having excellent abrasion resistance by adding polyisocyanate compounds having a low molecular weight to the above described composition to form a three-dimensional network structure and to improve heat resistance.

In commonly assigned application Ser. No. 74,467 entitled "Magnetic Recording Media" filed on even data herewith, magnetic recording media are disclosed in which the binder composition is characterized by a thermoplastic polyurethane resin in contrast to the prepolymer which characterizes the present invention. The prepolymer has been found very advantageous for use in recording media because it is more reactive than the thermoplastic resin and, as a result, provides a higher cross-linking density than is possible with the resin.

\* and corresponding to Japanese Application No. 111580/78

DETAILED DESCRIPTION OF THE INVENTION

It is, of course, known in this field that pigments, wetting agents, antistatic agents and lubricants can be used in the formation and application of the magnetic layer and dispersion is carried out using organic solvents.

The 2-chloroacrylonitrile polymers used in the present invention include homopolymers or copolymers of 2-chloroacrylonitrile ($\alpha$-chloroacrylonitrile $CH_2=CClCN$ molecular weight: 87.51). The 2-chloroacrylonitrile copolymers may contain up to about 30 mol% of a comonomer such as vinyl chloride, vinyl acetate, vinylidene chloride, acrylonitrile, an alkyl ($C_{1-8}$) acrylate or methacrylate such as ethyl acrylate, propyl acrylate, butyl acrylate, amyl acrylate, hexyl acrylate, heptyl acrylate, methyl methacrylate, ethyl methacrylate, propyl methacrylate, butyl methacrylate, amyl methacrylate, hexyl methacrylate, heptyl methacrylate, octyl methacrylate etc. The 2-chloroacrylonitrile polymers have a weight average molecular weight of about 10,000 to 300,000 and preferably 20,000 to 100,000. If the molecular weight is less than about 10,000, although the dispersibility of magnetic powders is excellent and magnetic recording media having excellent S/N ratio can be obtained, physical strength is poor and the abrasion resistance of the magnetic layers is inferior. On the other hand, if it is more than about 300,000, the dispersibility of the magnetic particles is inferior and compatibility with other resins deteriorates, resulting in deterioration of S/N ratio.

The polyurethane prepolymers used in the present invention are polyether prepolymers having at least two isocyanate (—NCO) groups as terminal groups produced by reacting diisocyanates and polyether glycols, which have a weight average molecular weight of 2,000 or more but less than 10,000 and preferably of about 3,000 to 6,000.

The polyether glycols used in preparing the prepolymers include: (1) polyalkylene ether glycols and, more particularly polyalkylene ether glycols in which the alkylene moiety contains about 2 to 5 carbon atoms (e.g., polyethylene ether glycol, polypropylene ether glycol, polytetraethylene ether glycol or polypentaethylene ether glycol, etc.); (2) polyalkylene arylene ether thioether glycols (e.g.,

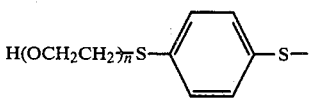

$(CH_2CH_2O)_{\overline{n}}H$ (n=1~4), etc.); (3) polyalkylene ether thioether glycols (e.g., $HO + CH_2CH_2S)_{\overline{p}} CH_2CH_2OH$ (p=1~4), etc.), and (4) polyalkylene arylene ether glycols (e.g., $H + OCH_2CH_2)_{\overline{q}}$

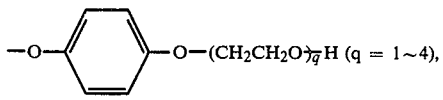

$-O-(CH_2CH_2O)_{\overline{q}}H$ (q = 1~4), etc.) etc.

The diisocyanates used in preparing the prepolymer include polyisocyanates comprising aromatic, saturated aliphatic or saturated alicyclic diisocyanates, and preferably 2,4-tolylenediisocyanate, m-phenylenediisocyanate, 4,4-biphenylenediisocyanate, 1,4-cyclohexylene diisocyanate, 1,5-tetrahydronaphthalene diisocyanate, 1,6-hexamethylene diisocyanate, 4-chloro-1,3-phenylenediisocyanate and 1,5-naphthalene diisocyanate, etc.

The above described polyurethane prepolymers are commercially available as Takenate (L-1007, L-1128, L-1150, L-1151, L-1153, L-1155, L-1156, L-1307, L-2710, L-2760 and L-6001) produced by Takeda Chemical Industries, Ltd.), Adiprene L produced by E. I. Du Pont de Nemours & Co. and Hi-prene (U-30, U-41Y, U-42, U-51, EX-116, L-100, L-167, L-213 and L-320, ect.) produced by Mitsui-Nisso Urethane Co.

A preferred mixing ratio by weight of the 2-chloroacrylonitrile polymers to the polyurethane prepolymers in the binder of the present invention is in the range of about 1/9 to 9/1 and preferably about 3/7 to 7/3. Further, the polyisocyanate compounds used together are used in the range of about 5 to 60 parts by weight per 100 parts by weight of the mixture of the above described resins.

The polyisocyanate compounds used in the present invention are isocyanates having at least two isocyanate groups and adducts thereof, examples of which include saturated aliphatic diisocyanates, saturated cyclo aliphatic diisocyanates, aromatic isocyanates such as benzene isocyanates, naphthalene isocyanates, biphenyl isocyanates, diphenylmethane diisocyanates, triphenylmethane diisocyanates, and adducts of them.

Examples of isocyanates include ethanediisocyanate, butanediisocyanate, hexanediisocyanate, 2,2-dimethylpentane diisocyanate, 2,2,4-trimethylpentane diisocyanate, decanediisocyanate, ω,ω'-diisocyanato-1,3-dimethylbenzene, ω,ω'-diisocyanato-1,2-dimethylcyclohexanediisocyanate, ω,ω'-diisocyanato-1,4-diethylbenzene, ω,ω'-diisocyanato-1,5-dimethylnaphthalene, ω,ω'-diisocyanato-n-propylbiphenyl, 1,3-phenylelediisocyanate, 1-methylbenzene-2,4-diisocyanate, 1,3-dimethylbenzene-2,6-diisocyanate, napthalene-1,4-diisocyanate, 1,1'-dinaphthyl-2,2'-diisocyanate, biphenyl-2,4'-diisocyanate, 3,3'-dimethyl-biphenyl-4,4'-diisocyanate, diphenylmethane-4,4'-diisocyanate, 2,2'-dimethyldiphenylmethane-4,4'-diisocyanate, 3,3'-dimethoxydiphenylmethane-4,4'-diisocyanate, 4,4'-diethoxydiphenylmethane-4,4'-diisocyanate, tolylenediisocyanate or 1,5-naphthylene diisocyanate, etc., dimers or trimers of these isocyanates and adducts composed of these isocyanates and dihydric or trihydric polyalcohols. Representative adducts are adducts of 3 moles of tolylenediisocyanate and 1 mole of trimethylol propane and 3 moles of hexamethylenediisocyanate and 1 mole of trimethylol propane. Further, adducts suitably selected from those of the above described isocyanates can be used.

The above described binder compositions of the present invention are preferably used in the amount of about 8 to 100 parts by weight, preferably about 10 to 80 parts by weight and, particularly, about 13 to 50 parts by weight per 100 parts by weight of the finely-divided ferromagnetic powder.

The magnetic layer in the present invention is a coated magnetic layer which is prepared by applying a magnetic coating obtained by mixing a finely-divided ferromagnetic powder with the above described binder, additives and solvents to a non-magnetic support, orientating and drying.

The magnetic layer is preferred to have a dry thickness of about 1 to 18 μm. But in case of magnetic recording media for digital record reproducing which have a protective layer, those having a thickness of up to about 30 μm can be used. Further, in case of multilayer structure, it is preferred that the sum total of the thickness of each layer is in the range of 1 to 18 μm. The dry thickness is determined according to the use, the shape (film, tape, sheet, disk, card or drum, etc.) or a standard of the magnetic recording medium.

The nonmagnetic support of magnetic media based on the present invention may be made of polyesters such as polyethylene terephthalate or polyethylene-2,6-naphthalate, etc., polyolefins such as polyethylene or polypropylene, etc., cellulose derivatives such as cellulose triacetate, cellulose diacetate, cellulose acetate butyrate or cellulose acetate propionate, etc., vinyl resins such as polyvinyl chloride or polyvinylidene chloride, etc. and plastics such as polycarbonates, polyimides or polyamides, etc., but also non-magnetic metals such as aluminium, copper, tin, zinc, or non-magnetic alloys thereof, etc., ceramics such as glass, porcelain or earthenware, etc., and papers such as paper or paper coated or laminated with barita or α-polyolefins having 2 to 10 carbon atoms such as polyethylene, polypropylene or ethylene-butene copolymer, etc. can be used. These nonmagnetic supports may be transparent or opaque depending on their use.

Further, the non-magnetic support may have any shape such as a film, tape, sheet, disk, card or drum, etc., and support materials are selected depending upon the use and the shape.

The thickness of these non-magnetic supports is in the range of about 2 to about 5 μm and preferably 3 to 25 μm in case that they are films, tapes or sheets. Further, it is in the range of about 20 to about 90 μm in case that they are flexible disk sheets (floppy type), and it is in the range of about 0.5 to 10 mm in case that they are disks or cards. In case that they are drums, they are cylindrical, the type of which can be determined according to a recorder used.

Processes for producing the magnetic coatings used for the above described coating type magnetic layer have been described in detail in Japanese Patent Publications 15/60, 26794/64, 186/68, 28043/72, 28045/72, 28046/72, 28048/72, 31445/72, 11162/73, 21331/73 and 33683/73, U.S.S.R. Pat. No. 308,033 and U.S. Pat. Nos. 2,581,414, 2,855,156, 3,240,621, 3,526,598, 3,728,262, 3,790,407 and 3,836,393. Magnetic coatings described therein comprise a finely-divided ferromagnetic powder, a binder and an application solvent as main components and sometimes contain other additives such as a dispersing agent, a lubricant, an abrasive to an antistatic agent, etc.

As the above described finely-divided ferromagnetic powder, ferromagnetic iron oxides, ferromagnetic chromium dioxide and ferromagnetic alloy powders can be used.

The ferromagnetic iron oxides mean ferromagnetic iron oxides represented by the general formula $FeO_x$ wherein x is in the range of $1.33 \leq X \leq 1.50$, namely maghemite ($\gamma$-$Fe_2O_3$, x=1.50), magnetite ($Fe_2O_3$, x=1.33) and Berthollide compounds of them ($FeO_x$, $1.33 < X < 1.50$). The value x is represented by the formula $$x = \frac{1}{200} \times \left\{ 2 \times \left( \begin{array}{c} \text{atomic \% of} \\ \text{2 valent iron} \end{array} \right) + 3 \times \left( \begin{array}{c} \text{atomic \% of} \\ \text{3 valent iron} \end{array} \right) \right\}$$

To these ferromagnetic iron oxides, divalent metals may be added. As the divalent metals, there are Cr, Mn, Co, Ni, Cu and Zn, which are added in the range of 0 to 10 atomic % based on the above described iron oxides.

The ferromagnetic chromium dioxide used include $CrO_2$ and $CrO_2$ to which 0 to 20 wt% of metals such as Na, K, Ti, V, Mn, Fe, Co, Ni, Tc, Ru, Sn, Ce or Pb, semiconductors such as P, Sb or Te, or oxides of these metals may be added.

It is effective that the above described ferromagnetic iron oxides and ferromagnetic chromium dioxide have an acicular ratio of about 2/1 to 20/1 and preferably 5/1 or more and an average length of 0.2 to 2.0 μm.

Ferromagnetic alloy powders have a composition comprising 75, wt% or more of metals wherein 80 wt% or more of the metals is at least one ferromagnetic metal (namely, Fe, Co, Ni, Fe-Co, Fe-Ni, Co-Ni or Co-Ni-Fe) and 20 wt% or less and preferably 0.5–5 wt% of the metals is Al, Si, S, Sc, Ti, V, Cr, Mn, Cu, Zn, Y, Mo, Rh, Pd, Ag, Sn, Sb, Te, Ba, Ta, W, Re, Au, Hy, Pb, Bi, La, Ce, Pr, Nd, B or P, which sometimes contain a small amount of water, hydroxides or oxides. The ferromagnetic alloy powders have an acicular ratio of about 5/1 to 20/1 and are about 0.5 μm or less in length. They have been described more specifically in Japanese Patent Publications 5515/61, 4825/62, 5009/64, 10307/64, 14090/69, 18372/70, 22062/72, 22513/72, 28466/71, 38755/71, 4286/72, 12422/72, 17284/72, 18509/72, 18573/72 and 39639/73, U.S. Pat. Nos. 3,026,215, 3,031,341, 3,100,194, 3,242,005, 3,389,014, 3,898,952, 3,913,131, 3,917,716, 3,929,604, 3,943,012, 3,966,510, 4,002,804, 4,007,072, 4,009,111, 4,015,030, 4,016,057, 4,020,236, 4,063,000, 4,066,564, 4,066,565, 4,069,164, 4,076,861 and 4,096,316, British Pat. Nos. 752,659, 782,762 and 1,007,323, French Pat. No. 1,107,654 and German Patent Application (OLS) No. 1,281,334.

Dispersing agents, lubricants, abrasives and antistatic agents may be added to the magnetic layer as additives in addition to the above described binder and ferromagnetic finely-divided powder.

As the dispersing agents, it is possible to use aliphatic acids having 12 to 18 carbon atoms, ($R_1COOH$, where $R_1$ is an alkyl or alkenyl group having 11 to 17 carbon atoms) such as caprylic acid, capric acid, lauric acid, myristic acid, palmitic acid, stearic acid, oleic acid, elaidic acid, linolic acid, linolenic acid or stearolic acid, etc., metal soaps comprising alkali metal (Li, Na and K) salts or alkaline earth metal (Mg, Ca and Ba) salts of the above described aliphatic acids, flourine containing compounds of esters of the above described aliphatic acids, amides of the above described aliphatic acids, polyalkylene oxide alkyl phosphoric acid esters, lecithin, and trialkyl-polyolefineoxy quaternary ammonium salts (the alkyl has 1 to 5 carbon atoms and the olefine is ethylene or propylene, etc.). In addition, higher alcohols having 12 or more carbon atoms and sulfuric acid ester thereof can be used. These dispersing agents are added in the range of 0.5 to 20 parts by weight per 100 parts by weight of the binder. They have been described in Japanese Patent Publications 28369/64, 17945/69, 7441/73, 15001/73, 15002/73, 16363/73 and 4121/75 and U.S. Patents 3,387,993 and 3,470,021.

As the lubricants, it is possible to use silicone oils such as dialkyl polysiloxanes (where the alkyl group has 1 to 5 carbon atoms), dialkoxy polysiloxanes (where the alkoxy group has 1 to 4 carbon atoms), monoalkyl monoalkoxy polysiloxanes (where the alkyl group has 1 to 5 carbon atoms and alkoxy has 1 to 4 carbon atoms), phenyl polysiloxanes or fluoroalkyl polysiloxanes (where the alkyl group has 1 to 5 carbon atoms), etc., electroconductive finely-divided powder such as graphite, finely-divided inorganic powders such as molybdenum disulfide or tungsten disulfide, etc., finely-divided plastic powders such as polyethylene, polypropylene, ethylene-vinyl chloride copolymer of polytetrafluoroethylene, etc., α-olefine polymers, unsaturated aliphatic hydrocarbons which are liquid at a room temperature (compounds having a n-olefinic double bond in the end carbon; carbon atom number: about 20), aliphatic acid esters composed of monobasic aliphatic acids having 12 to 20 carbon atoms and monohydric alcohols having 3 to 12 carbon atoms, and fluorocarbons. These lubricants are added in the range of 0.2 to 20 parts by weight per 100 parts by weight of the binder. They have been described in Japanese Patent Publication Nos. 29709/59, 11033/63, 23889/68, 40461/71, 15621/72, 18482/72, 28043/72, 30207/72, 32001/72, 7442/73, 14247/74, 5042/75, 14082/77, 18561/77, 8804/77, 49803/77, 49804/77, 49805/77, 67304/77, 70811/77, 19004/78 and 24806/78, U.S. Pat. Nos. 2,654,681, 3,470,021, 3,492,235, 3,497,411, 3,523,086, 3,625,760, 3,630,772, 3,634,253, 3,642,539, 3,687,725, 3,996,407, 4,007,313, 4,007,314, 4,018,967, 4,018,968, 4,110,503 and 4,135,016. "IBM Technical Disclosure Bulletin" Vol. 9, No. 7, page 779 (Dec. 1966) and "ELEKTRONIK" 1961, No. 12, page 380.

As the abrasives, it is possible to use conventionally used materials such as fused alumina, silicon carbide, chromium oxide ($Cr_2O_3$), corundum, artificial corundum, diamond, artificial diamond, garnet or emery (main component: corundum and magnetite), etc. These abrasives have 5 or more of the Mohs hardness and 0.05 to 5 μm and preferably 0.1 to 2 μm of the average particle size. These abrasives are added in the range of 0.5 to 20 parts by weight per 100 parts by weight of the binder. They have been described in Japanese Patent Publications No. 18572/72, 15003/73, 15004/73 (U.S. Pat. No. 3,617,378), 39402/74 and 9401/75, U.S. Pat. Nos. 3,007,807, 3,041,196, 3,293,066, 3,630,910, 3,687,725 and 4,015,042, British Pat. Nos. 1,145,349, and German Pat. (DT-PS) Nos. 853,211 and 1,101,000.

As the antistatic agents, it is possible to use finely-divided electroconductive powders such as of carbon black or carbon black graft polymers, etc., natural surface active agents such as saponin, etc., nonionic surface active agents such as alkylene oxide type, glycerine type or glycidol type agents, etc., cationic surface active agents such as higher alkylamines, quaternary ammonium salts, heterocyclic compounds including pyridine, phosphoniums or sulfoniums, etc., anionic surface active agents containing acid groups such as carboxylic acid, sulfonic acid phosphoric acid, sulfuric acid ester and phosphoric acid ester groups, and ampholytic surface active agents such as amino acids, aminosulfonic acids or sulfuric or phosphoric acid esters of aminoalcohols, etc.

The above described finely-divided electroconductive powders are added in the range of 0.2 to 20 parts by weight per 100 parts by weight of the binder and the surface active agents are added in the range of 0.1 to 10 parts by weight per 100 parts by weight of the binder.

Some examples of these finely-divided electroconductive powders and surface active agents capable of using as antistatic agents have been described in Japanese Patent Publications 22726/61, 24881/72, 26882/72, 15440/73 and 26761/73, Japanese patent application (OPI) Nos. 18561/77 and 38201/77, U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,443,654, 3,475,174 and 3,545,974, German Patent Application (OLS) 1,942,655, British Pat. Nos. 1,077,317 and 1,198,450 as well as "Kaimenkasseizai no Gosei to sono Oyo" written by Ryohei Oda (Maki Shoten Co., 1965), "Surface Active Agents" written by A. M. Schwartz and J. W. Perry (Interscience Publication Incorporated, 1958), "Encyclopedia of Surface Active Agents" vol. 2, written by J. P. Sisly (Chemical Publish Company, 1964) and "Kaimenkasseizai Binran" 6th print (Sangyo Tosho Co., Dec. 20, 1966).

These surface active agents may be added alone or as a mixture thereof. Although they are used as the antistatic agents, they sometimes are used for other purposes, for example, for dispersion, improvement of magnetic characteristics or improvement of a lubricating property or as application assistants.

As organic solvents used as the application solvents, it is possible to use ketones such as acetone, methyl ethyl ketone, methyl isobutyl ketone or cyclohexanone, etc., esters such as methyl acetate, ethyl acetate, butyl acetate, ethyl lactate or glycol monoethyl ether acetate, etc., tars (aromatic hydrocarbons) such as benzene, toluene or xylene, etc. and chlorinated hydrocarbons such as methylene chloride, ethylene chloride, carbon tetrachloride, chloroform, ethylene chlorohydrin or dichlorobenzene, etc.

The magnetic powder and the above described binder, the dispersing agent, the lubricant, the abrasive, the antistatic agent and the solvent are mixed to produce a magnetic coating composition.

In carrying out mixing, the magnetic powder and all the above described components are charged into a mixing apparatus may be added at the same time or in turn. For example, there is a method which comprises adding the magnetic powder to a solvent containing a dispersing agent and mixed for a desired period of time to produce a magnetic coating.

In carrying out dispersion by mixing the magnetic coating, various mixing apparatus are used. For example, there is a two-roll mill, a three roll mill, a ball mill, a pebble mill, a trommel mill, a sand grinder a Szegvari attritor, a high-speed impeller dispersing machine, a high-speed stone mill, a high-speed impact mill, a disperser, a kneader, a high-speed mixer, a homogenizer or an ultrasonic dispersing apparatus, etc.

Techniques concerning dispersion by mixing have been described in "Paint Flow and Pigment Dispersion" written by T. C. Patton (John Wiley & Sons Co., 1964) and U.S. Pat. Nos. 2,581,414 and 2,855,156.

In order to apply the above described magnetic recording layer to the base, it is possible to utilize air doctor coating, blade coating, air-knife coating, squeeze coating, dip coating, reverse roll coating, transfer roll coating, gravure coating, kiss coating, cast coating, spray coating, spin coating and other methods, which have been described in detail in "Coating Kigaku" pages 253–277, published by Asakura Shoten Co. (Mar. 20, 1971).

Further, in case of multilayer magnetic recording materials, two magnetic layers are pvovided by a continuous coating operation which comprises repeating a step comprising applying a magnetic layer to a nonmagnetic base by the above described coating method and drying it. Further, two magnetic layers may be provided at the same time by a multilayer simultaneous coating method described in Japanese Patent Applications (OPI) No. 98803/73 (German Patent DT-OS Nos. 2,309,159) and 99233/73 (German Patent DT-AS 2,309,158).

The magnetic layer applied to the base by the above described methods is then dried after subjected to, if necessary, an orientation treatment of the magnetic powder in the layer. Further, if necessary, the magnetic layer is subjected to a surface smoothening processing or the product is cut in a desired shape to produce the magnetic recording materials of the present invention.

It has been found that, when the magnetic recording layer is subjected to the surface smoothening processing, a magnetic recording material having a smooth surface and excellent abrasion resistance can be obtained. This surface smoothening processing can be carried out by smoothening before drying or by calendering after drying.

The orienting treatment is carried out under the following condition. The orientation magnetic field has a strength of about 500 to 3,000 Oe in alternating current or direct current.

The direction of orientation of the magnetic material is determined according to its use. Namely, in case of sound tapes, small-sized video tapes or memory tapes, orientation is carried out in a direction parallel to the lengthwise direction of the tape. In case of broadcasting video tapes, the orientation is carried out at 30° to 90° of inclination to the lengthwise direction.

Methods of orientation of the magnetic powder have been described in the following patents. For example, U.S. Pat. Nos. 1,949,840, 2,796,359, 3,001,891, 3,172,776, 3,416,949, 3,473,960 and 3,681,138 and Japanese patent publications Nos. 3427/57, 28368/64, 23624/65, 23625/65, 13181/66, 13043/73 and 39722/73. Further, in case of multilayer structure, as described in Japanese patent application (OPI) No. 79905/77, U.S. Pat. No. 3,775,178 and German Patent Publication (DT-AS) No. 1,190,985, orientation of the upper layer and that of the lower layer may be carried out in different directions from each other.

The drying temperature of the magnetic layer after orientation is about 50° to 120° C., preferably 70° to 100°

C. and particularly 80° to 90° C. The air flux is 1 to 5 kl/m² and preferably 2 to 3 kl/m² and the drying time is about 30 seconds to 10 minutes and preferably 1 to 5 minutes.

In carrying out the smoothening processing before drying of the magnetic layer, a magnet smoother, a smoothening coil, a smoothening blade or a smoothening blanket, etc. is used. They have been described in Japanese Patent Publication No. 38802/72, British Pat. No. 1,191,424, Japanese Patent Publication No. 11336/73 and Japanese Patent Application (OPI) Nos. 53631/74, 1102005/75, 77303/76, 151005/77 and 13404/78.

The calendering of the coated surface after drying the magnetic layer is preferred to carry out by a supercalender method which comprises passing between two rolls such as a metal roll and a cotton roll, a synthetic resin roll (for example, nylon or polyurethane, etc.) or a metal roll and a metal roll. The supercalendering is preferred to carry out under a condition, namely, under about 25 to 50 kg/cm of roll pressure, at about 35° to 150° C. of the temperature and at 5 to 200 m/min of the processing rate. If the temperature and the pressure become higher than the above described ranges, there is a bad influence upon the magnetic layer and the non-magnetic base. Further, if the processing rate is lower than about 5 m/min, the effect of surface smoothening can not be obtained and, if it is higher than about 200 m/min, the processing operation becomes difficult.

These surface smoothening processings have been described in U.S. Pat. Nos. 2,688,567, 2,998,325 and 3,783,023, German Patent Application (OLS) 2,405,222, Japanese Pat. Application (OPI) Nos. 53631/74, 10337/75, 99506/75, 92606/76, 10204/76 and 103404/76 and Japanese Patent Publication 17404/77.

Further, the base of the present invention may be back-coated on the reverse face (back face) to the magnetic layer side for the purpose of prevention of electrostatic charges, prevention of transfer, prevention of improvement of strength of the magnetic recording material, or matting of the back face.

This back layer is provided by applying a coating solution which is prepared by mixing at least one of the above described lubricants, abrasives and antistatic agents and, if necessary, dispersing agents for uniformly dispersing them with the known binder for magnetic recording mediums and an application solvent, to the back of the base, and drying. Either the magnetic layer or the back layer may be provided first to the base.

Preferred additives conventionally used include carbon black, graphite, talc, $Cr_2O_3$, $\alpha$-$Fe_2O_3$ (rouge and hematite) and silicone oils, etc. As the binder, thermosetting resins are preferred.

In case that the additives are inorganic compounds, they are mixed in the ratio of about 30 to 85 wt% and preferably 40 to 80 wt% based on the whole solid content of the back layer. In case that the additives are organic compounds, they are mixed in the ratio of about 0.1 to 30 wt% and preferably 0.2 to 20 wt% based on the whole solid content of the back layer. Further, the dry thickness can be suitably selected in the range of about 0.5 to 5.0 $\mu$m according to the whole thickness, use or shape of the magnetic recording material.

The above described back-coating has been described in, for example, Japanese Patent Publications No. 13411/77 and 17401/77, Japanese patent application (OPI) Nos. 150407/75, 14460/76, 8003/77, 8005/77, 8006/77, 17003/77, 25603/77, 30403/77, 37405/77, 40303/77, 40304/77, 96505/77, 102004/77, 42706/78 and 42707/78, Japanese Utility Model Publications Nos. 6268/77 and 42707/78, Japanese Utility Model Registration Application (OPI) Nos. 13411/77 and 17401/77 and U.S. Pat. Nos. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420, 3,166,668 and 3,761,311.

The above described magnetic recording mediums of the present invention show the following effects.

(i) The abrasion resistance at a high temperature and a high humidity (45° C., 80% RH) is excellent.

(ii) The coefficient of friction of the tape is low and running of the tape is stable.

(iii) The dispersibility of magnetic particles is good and the magnetic layer has a good squareness ratio.

(iv) The spontaneous combustion does not occur in the production step.

(v) Tapes having a high modulus of elasticity can be produced.

(vi) The magnetic coating solution is subject to less aggregation and has good storage stability (long not life).

(vii) The magnetic recording media are particularly suitable for tapes for video cassettes.

(viii) The magnetic recording mediums can be applied to audio tapes, magnetic sheets or digital tapes.

In the following, the present invention is illustrated in greater detail with reference to the following examples and comparison examples. It will be understood by persons skill in the art that the components, ratios and order of operations shown in the examples can be varied without departing from the scope and the spirit of the present invention.

In the following examples and comparison examples all parts are by weight.

EXAMPLE 1

Magnetic Coating Composition I

| | | Parts |
|---|---|---|
| A. | $\gamma$-$Fe_2O_3$ (Coercive force (Hc): 450 Oe, particle size: 0.6 × 0.07 × 0.07 $\mu$m) | 300 |
| B. | 2 chloroacrylonitrile Polymer (Average molecular weight: 58,000) | 30 |
| C. | Polyurethane Prepolymer (Reaction product of polytetraethylene ether glycol and 2,4-tolylenediisocyanate; weight average molecular weight: 8,000; content of —NCO group: 2) | 40 |
| D. | Electroconductive carbon black (average particle size: 30 milli-$\mu$m) | 20 |
| E. | Oleic acid | 3 |
| F. | Lecithin | 3 |
| G. | Solvent composed of methyl ethyl ketone (MEK)/toluene mixture (ratio by weight of the mixture: 1/1) | 700 |

The above described composition was adequately mixed in a ball mill to disperse. After being sufficiently dispersed, 7 parts of a 75 wt% solution of (H) a trifunctional polyisocyanate compound which was prepared by addition reaction of 3 mols of toluenediisocyanate and 1 mol of trimethylolpropane in ethyl acetate (Desmoldur L-75, produced by Bayer A. G.) and 200 parts of the solvent composed of MEK/toluene in the above described mixing ratio were added, and the mixture was sufficiently mixed to produce Magnetic coating solution

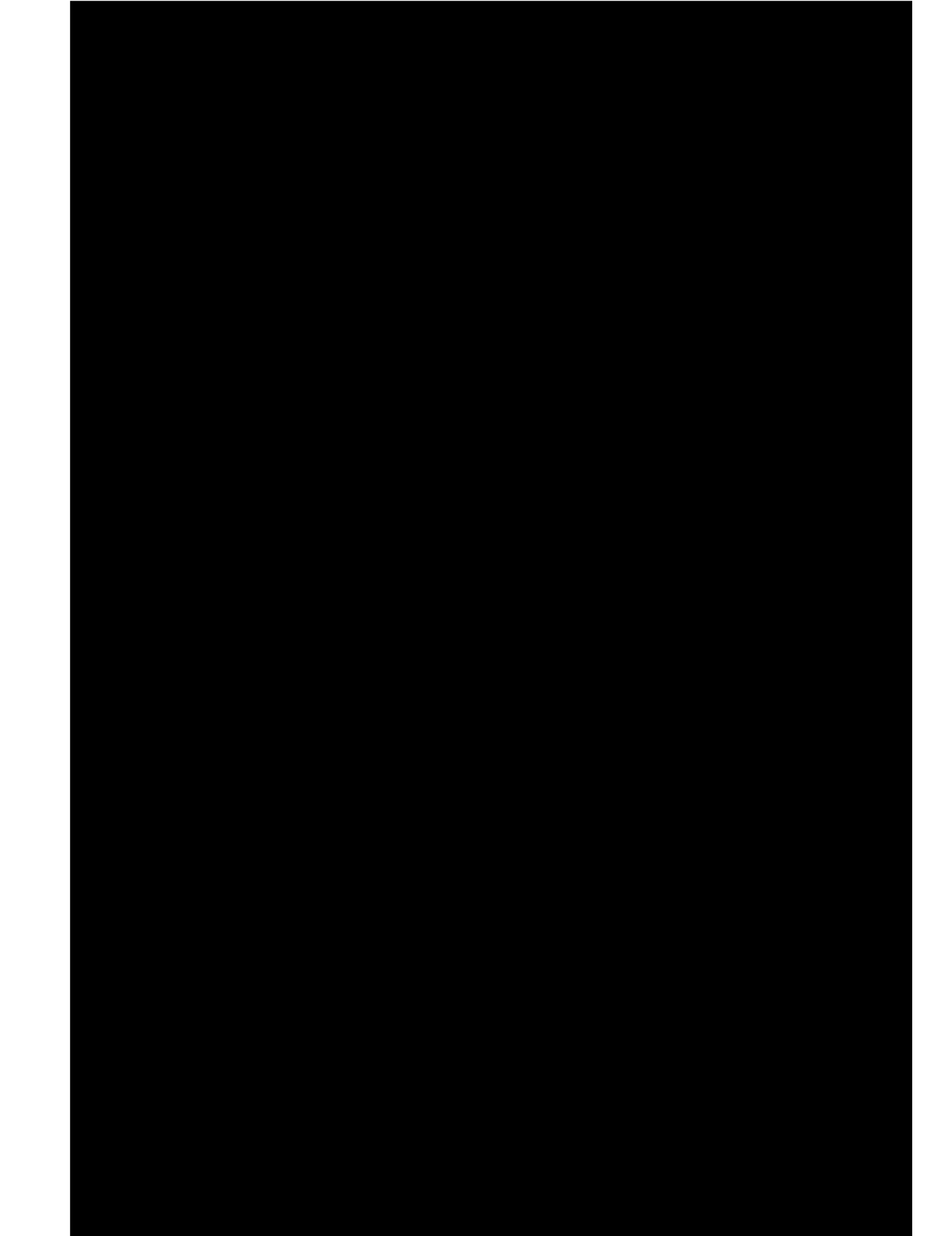

TABLE 3-continued

| Sample No. | Video Sensitivity[1] (dB) | Video S/N[2] (dB) | Decrease of Output After Running 100 Time (abrasion resistance)[3] (dB) |
|---|---|---|---|
| C-2 | −0.4 | −0.2 | −2.4 |
| C-3 | −0.3 | −0.3 | −3.0 |
| C-4 | −0.2 | −0.3 | −1.8 |
| C-5 | ±0 | −0.3 | −2.7 |

[1]Video sensitivity (dB): a relative value taking the video sensitivity of Sample No. C-1 as the standard (0 dB).
[2]Video S/N (dB): a relative value taking the video S/N of Sample No. C-1 as the standard (0 dB).
[3]Decrease of output after running 100 times (dB): using the initial output of each sample as the standard (0 dB).

It is understood from the above described results that, in magnetic recording materials using the binder components of the present invention, both the video sensitivty and the video signal-to-noise ratio are excellent. Further, when the decrease of output is measured by 100 times running ½ inch tapes having 3 minute length (about 6 meters) in order to compare the abrasion resistance, the decrease of output is −1.9 to −3.1 dB in case that the binder compositions of Comparison Samples, but it is −0.3 to −0.6 dB in case of the binder compositions of the present invention, which shows that the binders of the present invention are excellent as compared with the prior binder.

While the invention has been described in detail and with reference to specific embodiments thereof, it will be apparent to one skilled in the art that various changes and modifications can be made therein without departing from the spirit and scope thereof.

What is claimed is:

1. In a magnetic recording medium comprising a non-magnetic support and a recording layer comprising a finely divided ferromagnetic powder dispersed in a binder, the improvement wherein said binder comprises a 2-chloroacrylonitrile polymer and a polyurethane prepolymer having at least two terminal isocyanate groups.

2. The magnetic recording medium of claim 1, wherein said binder additionally contains a polyisocyanate compound.

3. The magnetic recording medium of claims 1 or 2, wherein said binder is present in the amount of about 10 to 80 parts by weight per 100 parts by weight finely divided ferromagnetic powder.

4. The magnetic recording medium of claim 2, wherein said polyisocyanate is an aliphatic diisocyanate, a cycloaliphatic diisocyanate, or an aromatic diisocyanate, and adducts thereof.

5. The magnetic recording medium of claim 2, wherein said polyisocyanate is present in an amount about 5 to 60 parts by weight per 100 parts by weight of the mixture of 2-chloroacrylonitrile and polyurethane.

6. The magnetic recording medium of claim 1, wherein said 2-chloroacrylonitrile polymer has a weight average molecular weight of about 10,000 to 300,000.

7. The magnetic recording medium of claim 1, wherein said polyurethane prepolymer is a polyether prepolymer.

8. The magnetic recording medium of claim 1, wherein said polyurethane has a weight average molecular weight of about 2,000 or more but less than 10,000.

9. The magnetic recording medium of claim 1, wherein said 2-chloroacrylonitrile polymer and said polyurethane prepolymer are present in a weight ratio of about 1:9 to 9:1.

10. The magnetic recording medium of claim 6, wherein said 2-chloroacrylonitrile polymer and said polyurethane prepolymer are present in a weight ratio of about 3:7 to 7:3.

11. The magnetic recording medium of claim 1, wherein said 2-chloroacrylonitrile polymer is a homopolymer or a copolymer containing up to 30 mol% of a monomer selected from the group consisting of vinyl chloride, vinyl acetate, vinylidene chloride, acrylonitrile or, an alkyl ($C_{1-8}$) acrylate or methacrylate.

12. The magnetic recording medium of claim 1, wherein said polyurethane has a weight average molecular weight of about 3,000 to 6,000.

13. A magnetic coating composition comprising a finely divided ferromagnetic powder, 2-chloroacrylonitrile polymer and a polyurethane prepolymer having at least two terminal isocyanate groups.

14. The magnetic coating composition of claim 13, wherein said binder additionally contains a polyisocyanate compound.

15. The magnetic coating composition of claims 13 or 14, wherein said binder is present in an amount of about 10 to 80 parts by weight per 100 parts by weight finely divided ferromagnetic powder.

16. The magnetic coating composition of claim 14, wherein said polyisocyanate is an aliphatic diisocyanate, a cycloaliphatic diisocyanate, or an aromatic diisocyanate, and adducts thereof.

17. The magnetic coating composition of claim 14, wherein said polyisocyanate is present in an amount of about 5 to 60 parts by weight per 100 parts by weight of the mixture of 2-chloroacrylonitrile and the polyurethane.

18. The magnetic coating composition of claim 13, wherein said 2-chloroacrylonitrile polymer has a weight average molecular weight of about 10,000 to 300,000.

19. The magnetic coating composition of claim 13, wherein said polyurethan prepolymer is a polyether prepolymer.

20. The magnetic coating composition of claim 13, wherein said polyurethane has a weight average molecular weight of about 2,000 for more but less than 10,000.

21. The magnetic coating composition of claim 13, wherein said 2-chloroacrylonitrile polymer and said polyurethane prepolymer are present in a weight ratio of about 1:9 to 9:1.

22. The magnetic coating composition of claim 21, wherein said 2-chloroacrylonitrile polymer and said polyurethane prepolymer are present in a weight ratio of about 3:7 to 7:3.

23. The magnetic coating composition of claim 13, wherein said 2-chloroacrylonitrile polymer is a homopolymer or a copolymer of 2-chloroacrylonitrile and up to 30 mol% of a monomer selected from the group consisting of vinyl chloride, vinyl acetate, vinylidene chloride, acrylonitrile, an alkyl ($C_{1-8}$) acrylate or methacrylate such as ethyl acrylate, propyl acrylate, butyl acrylate, amyl acrylate, hexyl acrylate, heptyl acrylate, methyl methacrylate, ethyl methacrylate, propyl methacrylate, butyl methacrylate, amyl methacrylate, hexyl methacrylate, heptyl methacrylate and octyl methacrylate.

24. The magnetic recording medium of claim 11, wherein said alkyl ($C_{1-8}$) acrylate or methacrylate is selected from the group consisting of ethyl acrylate, propyl acrylate, butyl acrylate, amyl acrylate, hexyl acrylate, heptyl acrylate, methyl methacrylate, ethyl methacrylate, propyl methacrylate, butyl methacrylate, amyl methacrylate, hexyl methacrylate, heptyl methacrylate and octyl methacrylate.

* * * * *